United States Patent [19]
Knights et al.

[11] 3,822,621
[45] July 9, 1974

[54] METHOD AND APPARATUS FOR CUTTING ELONGATE ARTICLES

[75] Inventors: Richard Northan Knights, Gloucester; Shore Robert Alexander, Straftford-upon-Avon, both of England

[73] Assignee: Imperial Metal Industries (Kynoch) Limited, Witton, Birmingham, England

[22] Filed: Mar. 23, 1973

[21] Appl. No.: 344,085

[30] Foreign Application Priority Data
Apr. 7, 1972   Great Britain..................... 16151

[52] U.S. Cl.............. 83/23, 29/1.3, 83/72, 83/158, 83/167, 83/212, 83/490
[51] Int. Cl............................ B26d 5/32, B26d 3/16
[58] Field of Search......... 83/80, 81, 212, 490, 355, 83/915.5, 23, 54, 158, 167, 72; 29/1.3

[56] References Cited
UNITED STATES PATENTS

| | | | |
|---|---|---|---|
| 2,452,856 | 11/1948 | Kerr | 83/81 |
| 3,236,133 | 2/1966 | De Pas | 83/915.5 |
| 3,646,894 | 3/1972 | Hasten et al. | 83/355 X |
| 3,648,556 | 3/1972 | Hamilton et al. | 83/355 X |
| 3,693,487 | 9/1972 | Murdock et al. | 83/355 X |

*Primary Examiner*—Andrew R. Juhasz
*Attorney, Agent, or Firm*—Cushman, Darby and Cushman

[57] ABSTRACT

Apparatus and method for cutting elongate articles, particularly tube, into individual short lengths, the apparatus comprising a rotatable cutting blade of which the axis is movable along an eccentric path with respect to the tube.

8 Claims, 1 Drawing Figure

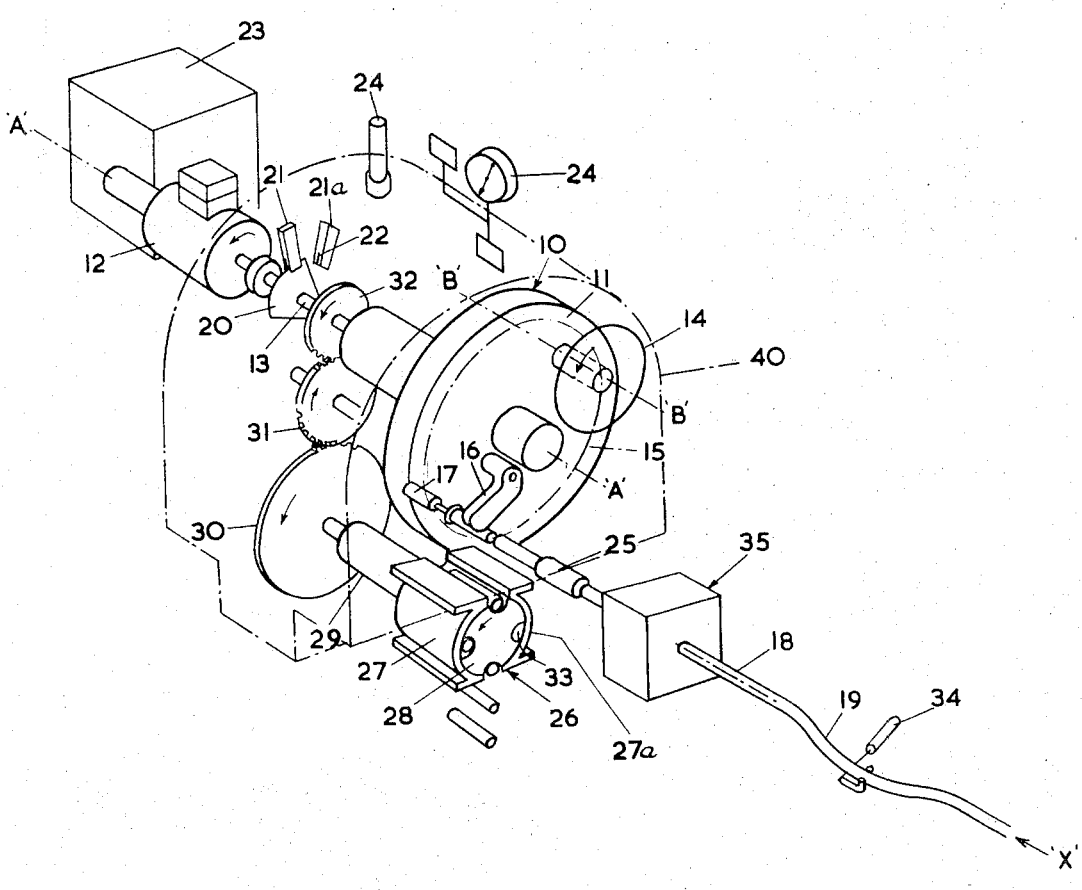

METHOD AND APPARATUS FOR CUTTING ELONGATE ARTICLES

FIELD OF THE INVENTION

This invention relates to a method and apparatus for cutting an elongate article, particularly, but not exclusively, a length of tube, into individual short lengths. The path of movement of the rotary cutting blade is contained within a pressure chamber, the severed short lengths of the tube being discharged from the chamber through an air lock.

DESCRIPTION OF THE PRIOR ART

A length of tube is usually severed into individual short lengths by moving a rotary knife or saw blade in a rectilinear path transversely through the tube. However this necessitates stopping and reversing the rectilinear movement of the blade at each end of the rectilinear path. Consequently, difficulties arise if the cutting operation is to be synchronised with a high rate of feed of tube and short lengths are to be cut off in quick succession, e.g. several per second.

SUMMARY OF THE INVENTION

According to the present invention a method of cutting an elongate article into individual short lengths comprises mounting a rotary cutting blade for rotation about the blade axis, continuously rotating the blade about its axis, moving the blade unidirectionally along a path of movement eccentric with respect to a feed path of the elongate article, and feeding an end portion of the elongate article along said feed path to a cutting station at which the rotary cutting blade intersects and severs the elongate article to provide an individual short length thereof.

Preferably the eccentric path of movement of the cutting blade axis is circular and the end portion of the length of elongate article is fed to a position radially outside the eccentric path.

Alternatively, the end portion of the elongate article may be fed to a position radially within the eccentric path.

The invention also includes an apparatus for cutting an elongate article into individual short lengths, the apparatus comprising a rotary cutting blade mounted for rotation about the blade axis, and means for moving the blade axis unidirectionally along a path of movement eccentric with respect to a feed path of the elongate article to be cut whereby, in use, the blade can move to intersect and sever the elongate article to provide an individual short length thereof.

Conveniently, the cutting blade is mounted for rotation on a rotatable housing of an epicyclic gear device and at a position eccentric with respect to the axis of rotation of the housing.

Preferably a knock-out arm is provided to revolve in synchronism with the rotary cutting blade to intersect the feed path of the elongate article and assist in removing a severed length of the elongate article from the feed path.

The apparatus preferably comprises means for longitudinally locating an end of the elongate article, said means serving to stop the feed of the article and to initiate one revolution of the cutting blade axis along its eccentric path of movement. The means is conveniently a position tansducer.

The invention has particular application in the cutting of plastics tube, intended for example for tubular cartridge cases of shotgun cartridges. Such cartridge cases are made from biaxially orientated polyethylene, the circumferential orientation being achieved by applying an internal air pressure to the extruded tube.

It would be convenient if the tube cutting operation could be operationally linked with the tube extension. In this circumstance the apparatus is provided with a pressure chamber which accommodates the path of movement of the rotary cutting blade and movement of the blade along said path, and an air lock to permit passage of severed individual short lengths of tube from the chamber.

The air lock may take the form of a radially recessed rotor, sealingly rotatable within a casing of the pressure chamber, the recesses being adapted to receive severed lengths of tube within the chamber and to eject the tube to the exterior of the chamber.

In order to monitor whether the cutting blade is in the vicinity of the feed path of the tube to be cut, particularly when feeding in tube at the commencement of a production run, the apparatus comprises detector and signal transmitting means. This means may be, for example, a vane mounted for rotation in synchronism with the movement of the blade axis along its path of movement and arranged for movement through two stationary and angularly spaced-apart detectors electrically connected to a control unit which controls the feed of the elongate article along its feed path. If an epicyclic gear device is employed, the vane may be mounted for rotation with the rotatable housing of the device.

BRIEF DESCRIPTION OF THE DRAWING

In order that the invention may be more clearly understood, one embodiment thereof will now be described, by way of example only, with reference to the accompanying drawing which is a schematic view of an apparatus for cutting tube for shotgun cartridge cases.

DESCRIPTION OF THE PREFERRED EMBODIMENT

The apparatus comprises an epicyclic gear device 10 of which the annulus, ie the gear housing 11, is rotatable unidirectionally about an axis 'A—A'. The gear housing 11 is driven by a servo-controlled hydraulic motor 12 through a drive shaft 13. A rotary cutting blade 14 is mounted parallel to but spaced from an end face of the housing 11 on an axis 'B—B' which is eccentric with respect to the axis 'A—A', the path of movement 15 of the axis 'B—B' being indicated by a broken line. Diametrically opposite the axis 'B—B' a knock-out arm 16 is secured to the housing 11 to extend radially thereof but spaced therefrom and revolves about the axis 'A—A' in synchronism with the blade 14. The knock-out arm 16 comprises two axially spaced apart arcuate edge cam portions which sweep a severed end portion of tube from between the transducer 17 and the remaining length of tube 19 into a recess 33 in air lock rotor 28 during each revolution of the gear housing 11. In order to permit rotation of the edge cam portions of the knock-out arm 16, a supporting block (not shown) for the end portion of the tube mounted inside the pressure chamber 40 is slotted.

A pressure chamber tube position transducer 17 is mounted on a support (not shown) radially just outside the path of movement 15 and axially in line with a feed path 18 of a length of tube 19 which is to be cut into individual short lengths at a cutting station. Clearly, the path of movement 15 is eccentric with respect to the feed path 18 of the tube 19.

Intermediate the device 10 and the motor 12 a brass vane 20 having an arcuate periphery is secured to the drive shaft 13. Two angularly spaced-apart detectors 21, 21a are mounted so that the peripheral portion of the vane 20 can pass through slots 22 in the detectors to induce signals which are transmitted to a control unit 23 to indicate the angular position of the vane and correspondingly the angular position of the axis of the cutting blade 14 with respect to the axis 'A—A' as the blade moves along the path of movement 15.

The apparatus so far described, apart from the motor 12, is contained with a pressure chamber 40 indicated in broken lines and maintained, in use, under internal air pressure.

A pressure relief valve is indicated at 24 and an air pressure gauge at 24a. An inlet gland 25 is provided in an end wall of the pressure chamber whereby the tube 19 may be introduced into the chamber. A support (not shown) is provided for the free end portion of the tube, the support comprising a longitudinal passageway to receive the end portion and a lateral outlet slot for the end portion after cutting, the slot being offset from a radial position of the passageway. Two transverse slots are provided in the support for passage of the arms 16.

In order to discharge the individual lengths of tube from the pressure chamber a rotary air lock 26 is attached to the wall of the pressure chamber and adjacent the outlet slot of said support. The air lock 26 comprises two half-shells 27,27a between which a rotor 28 is disposed. The rotor is connected to a shaft 29 to which a driven gearwheel 30 is secured. The wheel 30 is driven through an intermediate gearwheel 31 from a gearwheel 32 secured on the drive shaft 13. The rotor 28 has four equi-angularly spaced recesses 33 to receive individual lengths of tube. Between the recesses 33 carbon rubbing strips (not shown) are inserted in the rotor to form rubbing contact with the shells 27,27a to minimize air loss.

In use of the apparatus for cutting the length of tube 19 into individual short lengths for shotgun cartridge cases, the tube 19 under internal pressure is fed from a tube extrusion machine (not shown), along the feed path 18 in the direction of arrow 'X' through a loop transducer 34, and then through a suitable tube feed device indicated by reference number 35 and coupled electrically to the control unit 23. Initially the tube is clamped at a distance from its free end to maintain its internal pressure which is utilized to obtain the molecular orientation of the tube wall during tube extrusion, and air supply to the pressure chamber is switched off. The cutting blade 14 is positioned just below the feed path 18. An end portion of the length of tube 19 is introduced through the inlet gland 25 and into the pressure chamber until the end portion is located in the support (not shown) and the end of the tube contacts and depresses the position transducer 17 approximately 0.2 inch (5mm). The air supply to the pressure chamber is then switched on to equalize the internal pressure of the tube and the tube clamp is removed.

Signals from the transducer 17 to the control unit 23 cause the feed device 35 to be in a non-tube feeding condition and cause the motor 12 to effect rotation of the housing 11 through one complete revolution so that the locus of the axis of the rotating cutting blade 14 is along the path of movement 15 and is thereby orbital with respect to the axis 'A—A'. During this movement the blade 14 severs a short length from the tube 19, and the knock-out arms 16 move the individual cut length into a recess 33 of the air lock rotor 28. The position transducer 17 now moves forwardly by 0.2 inch (5mm) to signal that the cut-off tube is clear of the feed path 18 and to initiate a further feed of tube 19 through the feed device 35. During two subsequent cycles of the apparatus, the rotor of the air lock moves through 180° to release the cut-off length from the air lock 26.

Since the feed of tube 19 from the associated extrusion apparatus is substantially constant and the feed of tube into the cutting apparatus is intermittent, the tube is allowed to form into a loop which passes through the loop transducer 34 to enable an increase or decrease of loop curvature and thus of tube velocity to be correlated, through the control unit 23, between the extrusion apparatus, the feed device 35 and the rotational speed of the cutting device.

We claim:

1. A method of cutting an elongate article into individual short lengths comprising (a) mounting a rotary cutting blade for rotation about an axis of rotation, (b) continuously rotating said blade about said axis, (c) moving said blade axis unidirectionally along a path of movement eccentric with respect to a feed path of said elongate article, said path of movement of said rotary cutting blade and movement of said blade along said path taking place within a pressure chamber, (d) feeding an end portion of said elongate article along said feed path to a cutting station within said pressure chamber at which said rotary cutting blade intersects and severs said elongate article to provide an individual short length thereof, and (e) discharging said short length from said pressure chamber through an air lock.

2. Apparatus for cutting an elongate article into individual short lengths, said apparatus comprising (a) a rotary cutting blade mounted for rotation about an axis of rotation, (b) means for moving said blade axis unidirectionally along a path of movement eccentric with respect to a feed path of said elongate article, (c) a pressure chamber surrounding said blade so that said path of movement of said blade and movement of said blade along said path of movement are completely contained therewithin, and (d) means for discharging severed short lengths of tube from said chamber, said means including an air lock attached to said pressure chamber.

3. Apparatus as recited in claim 2 wherein said air lock comprises a rotor sealingly rotatable within a casing of said pressure chamber, said rotor having angularly spaced apart recesses for receiving said severed lengths of tube within said chamber, and from which said lengths are discharged to the exterior of said chamber.

4. Apparatus as recited in claim 2 wherein detector and signal transmitting means are provided to monitor the position of said cutting blade along its said path of movement.

5. Apparatus as recited in claim 4 wherein said detector and signal transmitting means comprises a vane mounted for rotation in synchronism with the movement of said blade axis along its said path of movement, said vane being movable through two stationary and angularly spaced-apart detectors electrically connected to a control unit which controls the feed of said elongate article along its said feed path.

6. Apparatus as recited in claim 2 wherein a knockout arm is provided to rotate in synchronism with said blade to intersect said feed path of said elongate article and assist in removing a severed length of said elongate article from said feed path.

7. Apparatus as recited in claim 2 further comprising means for longitudinally locating an end of said elongate article, said means serving to stop the feed of said article and to initiate one revolution of said cutting blade axis along its said eccentric path of movement.

8. Apparatus as recited in claim 7 wherein said means for longitudinally locating an end of said elongate article includes a position transducer.

* * * * *